US012630378B2

(12) United States Patent
Sohlberg et al.

(10) Patent No.: US 12,630,378 B2
(45) Date of Patent: May 19, 2026

(54) SYSTEM FOR RETROSPECTIVELY WEIGHING A TRANSPORTING ASSET

(71) Applicant: VOLVO TRUCK CORPORATION, Gothenburg (SE)

(72) Inventors: Per Sohlberg, Hovås (SE); Bo Strömberg, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 446 days.

(21) Appl. No.: 18/317,643

(22) Filed: May 15, 2023

(65) Prior Publication Data

US 2023/0373737 A1 Nov. 23, 2023

(30) Foreign Application Priority Data

May 18, 2022 (SE) .................................... 2250593-7

(51) Int. Cl.
B65G 65/00 (2006.01)
G06Q 10/08 (2023.01)
(52) U.S. Cl.
CPC .... B65G 65/005 (2013.01); B65G 2203/0258 (2013.01); G06Q 10/08 (2013.01)
(58) Field of Classification Search
CPC .......... B65G 65/005; B65G 2203/0258; G06Q 10/08
See application file for complete search history.

(56) References Cited

U.S. PATENT DOCUMENTS

| | | | | |
|---|---|---|---|---|
| 4,337,878 | A * | 7/1982 | Brock | ..................... E01C 19/10 |
| | | | | 177/1 |
| 6,313,414 | B1 * | 11/2001 | Campbell | .............. G01G 19/08 |
| | | | | 73/1.13 |
| 7,650,734 | B2 | 1/2010 | Beck et al. | |
| 12,420,866 | B2 * | 9/2025 | Lu | .............................. B60R 1/26 |

(Continued)

FOREIGN PATENT DOCUMENTS

WO 2021151505 A1 8/2021

OTHER PUBLICATIONS

European Search Report in corresponding Swedish Application No. 23170139.2-1001 dated Sep. 20, 2023 (5 pages).

(Continued)

*Primary Examiner* — Kyle O Logan
(74) *Attorney, Agent, or Firm* — Jeffri A. Kaminski; Venable LLP

(57) ABSTRACT

A system and related method for retrospectively a transporting asset wherein the system comprises a transporting asset for receiving material; a loading asset arranged at a loading site and configured to load the transporting asset with material; wherein the transporting asset is configured to be transported to a second site, the system further comprising: a weight measurement device arranged at the second site, the weight measurement device is configured to measure the weight of the transporting asset prior to the transporting asset offloading the material, the weight measurement device is configured to transmit weight data associated with the measured weight of the transporting asset; a controller configured to receive the weight data and instruct the loading asset to adapt its operation based on the weight data during subsequent loading.

14 Claims, 3 Drawing Sheets

(56)                    References Cited

U.S. PATENT DOCUMENTS

| | | | |
|---|---|---|---|
| 2002/0072923 A1* | 6/2002 | Guidry | G06Q 10/30 |
| | | | 705/308 |
| 2007/0135985 A1 | 6/2007 | Berry et al. | |
| 2009/0151421 A1 | 6/2009 | Susor | |
| 2014/0167971 A1* | 6/2014 | Stanley | E02F 9/2296 |
| | | | 340/666 |
| 2015/0112954 A1* | 4/2015 | Collins | G06Q 10/083 |
| | | | 707/702 |
| 2019/0370725 A1 | 12/2019 | Ha et al. | |
| 2020/0308803 A1* | 10/2020 | Singh | E02F 3/434 |
| 2021/0182758 A1* | 6/2021 | Deenathayalan | G06Q 10/06 |
| 2021/0277627 A1* | 9/2021 | Lucas | E02F 3/434 |
| 2022/0145592 A1* | 5/2022 | Zimmerman | G01G 5/04 |
| 2023/0064023 A1* | 3/2023 | Vernersson | G01G 19/083 |
| 2023/0392345 A1* | 12/2023 | Yoshida | E02F 3/435 |
| 2024/0159146 A1* | 5/2024 | Constancon | E02F 9/26 |
| 2024/0253270 A1* | 8/2024 | Piosik | B28C 5/422 |

OTHER PUBLICATIONS

Swedish Office Action dated Jul. 26, 2024 in corresponding Swedish Patent Application No. 2250593-7, 6 pages.
Swedish Office Action and Search Report in corresponding Swedish Application No. 2250593-7 dated Jan. 20, 2023 (7 pages).

* cited by examiner

SYSTEM FOR RETROSPECTIVELY WEIGHING A TRANSPORTING ASSET

TECHNICAL FIELD

The invention relates to weight measurements of a transporting asset, more specifically to a system and method for retrospectively weighing a transporting asset.

The invention can be applied in heavy-duty vehicles, such as dump trucks, construction equipment and transportation. Although the invention will be described with respect to a transporting asset and a loading asset, it should be understood that this may relate to transporting assets and loading assets primarily within the field of construction, agriculture or general transportation of goods. For example, a transporting asset could be a truck, a dump truck, an articulated hauler and/or any vehicle suitable of transporting material, preferably from a construction site, and a loading asset could be for example a vehicle or an infrastructure such as a wheel loader, an excavator, a backhoe loader, a silo, a conveyor or any asset suitable of loading the loading asset with material, preferably at a construction site.

BACKGROUND

Within transportation, in particular within the field of construction or agriculture, there is a constant strive for increasing efficiency. Transporting goods or material from one point to another, typically excess material and/or waste material from for example a construction site, is often resource demanding. It may be time- and energy consuming both when loading, for example, a truck and when transporting the truck from a source site to a unloading site. In order to increase efficiency, the weight of the material loaded onto the truck, i.e. the payload of the truck, is preferably maximized with respect to a maximum payload of the truck in order to reduce the amount of times the truck has to transport the material from source site, e.g. a construction site. The payload might be estimated when loading the truck by calculating the number of buckets or by visually determining the amount of material loaded onto the truck. This way of estimating the payload is inaccurate and the payload is often significantly lower than the maximum payload for the truck. Alternatively, the payload of the truck may be measured when loading the truck by for example built-in weight measurement devices in the loader or the truck, typically not calibrated and/or having a low precision, such that an estimated weight of the payload is provided. A drawback of estimating the payload according to above and/or by measuring the payload using the using the built-in measurement devices having low precision, typically about +/−3%, is that the weight measurements will provide deviations between the actual weight and the measured weight dependent on which type of loading asset and/or transportation asset is used. Another drawback is that different loading assets and transportation asset may be used, where the built-in measurement devices are not always provided or that the built-in measurement devices have different precision and/or characteristics leading to complexity when determining the payload of the transportation asset, i.e. the truck. For example, a fleet of vehicles may consist of vehicles from different manufactures, vehicles having different equipment and/or vehicles having different properties that may result in the vehicles having different abilities of providing the necessary information and/or providing information with various accuracy. Another way to measure the weight and to partly solve this is to measure the weight of the truck at the loading site using a separate weight measurement device, such as a stand-alone sale, during loading of the material to the truck. However, this is not desirable as this might put demands on positioning the dump truck with respect to the loader and the separate weight measurement device which is time consuming, reduces efficiency and may also lead to traffic congestion at the loading site. Further, positioning a scale at loading site might not be possible due to lack of space or disruption of transport flow in larger sites.

Accordingly, there are drawbacks within prior art and there is need for improvements.

SUMMARY

It is an object of the present disclosure to mitigate, alleviate or eliminate one or more of the above-identified deficiencies and disadvantages in the prior art and solve at least the above-mentioned problem. More specifically, an object of the present disclosure is to improve efficiency when transporting material from one point to another, typically being from a construction site to a dump site.

According to a first aspect of the invention, the object is achieved by a system for retrospectively weighing a transporting asset wherein the system comprises a transporting asset comprising a container for receiving material. The system further comprises a loading asset arranged at a loading site and configured to load the container of the transporting asset with material such that the transporting asset is provided with loaded material. This loading could be referred to as a first loading. The transporting asset is configured to be transported to a second site being remote from the loading site. The system further comprises a weight measurement device arranged at the second site where the weight measurement device is configured to measure the weight of the transporting asset prior to the transporting asset offloading the material. The weight measurement device is configured to transmit weight data associated with the measured weight of the transporting asset. The system further comprises of a controller configured to receive the weight data and instruct the loading asset to adapt its operation based on the weight data during a subsequent loading.

By the subsequent loading it is hereby meant a subsequent loading of the transporting asset and/or another transporting asset. This could be referred to as a subsequent loading of a subsequent transporting asset where the subsequent transporting asset could either be the transporting asset returning to the loading site or another transporting asset being loaded. Further, by subsequent loading is should be understood as a loading subsequent to a first loading wherein the subsequent loading is adapted based on the first loading.

The loading site may typically be located at a construction site, where there may be a need of removing excess material and/or waste material.

The second site may be a dump site, where the material loaded to the transporting asset is to be dumped, or an intermediate site between the loading site and the dump site. The intermediate site could for example be a traffic junction or similar, where transporting assets from one or more loading sites pass.

The invention is based on the understanding that a time efficient loading of the transporting asset is combined with a weight measurement of the transporting asset remote to the loading site, wherein data associated with the weight measurement performed remote to the loading site is fed back to the loader such that the loader adapts its operation based on the data during subsequent loadings of transporting assets.

Accordingly, the controller may instruct the loading asset to adapt its operation such that the payload of transporting assets subsequently being loaded are closer to the maximum payload of that transporting asset. In this way, a time efficient loading of the transporting asset is achieved while providing a facilitated weight measurement of the transporting asset. By the controller being configured to instruct the loading asset, it should be understood as the controller being configured to provide feedback to the loading asset based in the weight measurement at the second site. Accordingly, the first aspect provides alleviated risk of traffic congestion at the loading site while providing weight measurement that is used when subsequently loading at least one transporting asset, by the loading asset being instructed to adapt its operation based on the weight data. Hence, an increase efficiency in loading transporting assets is achieved by increasing traffic flow through the loading site and the ability to optimize the payload of subsequent loadings of transporting assets, where the payload of the subsequently loaded transporting assets are close to their maximum payload.

According to an embodiment at least one of the weight measurement device and the controller is configured to determine the weight of the loaded material based on at least one of vehicle data associated with the transporting asset and a weight measurement of the transporting asset without the material being loaded.

This is advantageous in that a facilitated determination of the payload of the transporting asset is achieved.

According to an embodiment the system is configured to provide an estimated weight of the loaded material.

Generating an estimated weight according to the above embodiment is advantageous in providing an efficient loading of the transporting asset. The estimated weight may be estimated by the machine operator, i.e. the operator of the transporting asset and/or by the built-in weighing system in the loading asset and/or the transporting asset.

According to an embodiment the transporting asset comprises a predetermined max payload and wherein the loading asset loads the transporting asset with the material based on the predetermined max payload and the estimated weight of the loaded material.

By loading the transporting asset taking the estimated weight of the material loaded onto the transporting asset and the predetermined max payload into account, an efficient loading of the transporting asset is provided.

According to an embodiment the controller and/or the weight measurement device is configured to determine a difference between, and/or a ratio of, the measured weight and the estimated weight of the transporting asset and wherein the controller is configured to instruct the loading asset to adapt its operation during the subsequent loading based on at least one of the difference between, or the ratio of, the measured weight and the estimated weight of the transporting asset.

This embodiment is advantageous in improved operation during the subsequent loading.

According to an embodiment the system is configured to provide a digital confirmation receipt for the transporting asset in response to the transporting asset being loaded such that the digital confirmation receipt is associated with the estimated weight of the material loaded to the transporting asset and wherein the system is configured to update the digital confirmation receipt in response to the weight measurement device measuring the weight of the transporting asset such that the digital confirmation receipt is associated with the measured weight of the transporting asset.

The system wherein the weight measurement device is a calibrated weight measurement device. Accordingly, the weight measurement device may be a weight measurement device, i.e. a scale, that is approved by authorities to provide a high precision weight measurement. By high precision it is hereby meant a weight measurement providing an error within predefined boundaries, wherein the predefined boundaries are low, significantly lower than the provided error when estimating the weight of the material loaded onto the transporting asset. In turn this provides an improved accuracy when instructing, i.e. giving feedback to, the loading asset to adapt its operation.

By providing a digital confirmation receipt, the payload of the transporting asset is logged together with the specific loading and/or transport. By updating the digital confirmation receipt in response to the weight measured by the weight measurement device at the second site a more accurate payload weight is logged, which in turn may provide an improved follow-up.

By the weight measurement device being calibrated provides an improved measurement at the second site, providing a more accurate weight measurement.

These embodiments combined is advantageous in providing a more accurate digital confirmation receipt compared to if the digital confirmation receipt was only based on the estimated weight at the loading site and/or a non-calibrated weight measurement device at the second site. This is especially advantageous when analysing the efficiency of the material transport from the loading site.

According to an embodiment, the weight measurement device is configured to determine a measured weight of the truck that has a deviation from the actual weight of the truck being less than 100 kg, preferably less than 60 kg, more preferably less than 40 kg, most preferably less than 20 kg.

According to an embodiment, the weight measurement device is a stationary weight measurements device or a mobile weight measurements device.

According to a second aspect of the invention, a computer implemented method for retrospectively weighing a transporting asset a comprises loading, by a loading asset, material to a container of the transporting asset when the transporting asset is arranged at a loading site;

transporting the transporting asset from the loading site to a second site, where the second site is remote to the loading site;

measuring the weight of the transporting asset, by a weight measurement device at the second site, prior to the transporting asset offloading the material;

transmitting, by the weight measurement device, weight data associated with the measured weight of the transporting asset;

receiving, by a controller, the weight data, and;

instructing, by the controller, the loading asset to adapt its operation during subsequent loading based on the weight data.

Advantages and effects of the computer implemented method of the second aspect are largely analogous to the advantages and effects of the weighing system of the first aspect. Accordingly, by the provision of the method, a time efficient loading of the transporting asset is combined with a measurement of the weight of the transporting asset remote to the loading site, wherein data associated with the weight measured of the transporting asset at the second site is fed back to the loader such that the loader adapts its operation based on the data during subsequent loadings of transporting assets. This is advantageous in providing a reduced risk of traffic congestion at the loading site while also providing a weight measurement of the transporting asset, where the data from the weight measurement is used during the subsequent loading. Hence, an increased efficiency is achieved by increasing traffic flow through the loading site and the ability to optimize the payload of subsequent loadings of transporting assets, where the payload of the subsequently loaded transporting assets are close to their maximum payload.

According to an embodiment the method comprises determining the weight of the material loaded to the transporting asset based on at least one of vehicle data associated with the transporting asset and a weight measurement of the transporting asset without the material being loaded.

This is advantageous in that a facilitated determination of the payload of the transporting asset is achieved.

According to an embodiment the method comprises providing an estimated weight of the material loaded to the transporting asset.

Providing an estimated weight according to the above embodiments are advantageous in providing an efficient loading of the transporting asset. It should be understood that estimating the weight of the material loaded to the transporting asset, i.e. the loaded material, may be done continuously during loading and/or right after the material has been loaded onto the transporting asset.

According to an embodiment the step of loading, by a loading asset, material to a container of the transporting asset takes into account a predetermined max payload of the transporting asset and the estimated weight of the material.

By loading the transporting asset taking the estimated weight of the material loaded onto the transporting asset and the predetermined max payload into account, an efficient loading of the transporting asset is provided.

According to an embodiment the method further comprises determining a difference between, and/or a ratio of, the measured weight and the estimated weight of the transporting asset and wherein the step of instructing, by the controller, the loading asset to adapt its operation during subsequent loading, is based on at least one of the difference between, or the ratio of, the measured weight and the estimated weight of the transporting asset.

This embodiment is advantageous in improved operation during the subsequent loading.

According to an embodiment the method further comprises loading a subsequent transporting asset based on the difference between the measured weight and the estimated weight of the transporting asset.

This is advantageous in providing an improved ratio of payload of the subsequent transporting asset to maximum payload of the subsequent transporting asset.

According to an embodiment the step of loading the transporting asset comprises generation of a digital confirmation receipt for the transporting asset such that the digital confirmation receipt is associated with the estimated weight of the material loaded to the transporting asset. The method further comprises updating the digital confirmation receipt in response to measuring the weight of the transporting asset such that the digital confirmation receipt is associated with the measured weight of the transporting asset.

By updating the digital confirmation receipt in response to the weight measurement device measuring the weight of the transporting asset a second measurement of the weight is provided such that a more accurate determination of the weight of the transporting asset is provided.

According to a third aspect of the invention, the object is achieved by a system for retrospectively weighing a transporting asset for determining the weight of the material loaded onto the transporting asset wherein the system comprises the system according to the aspect and where in the system further comprises a transporting asset comprising a container for receiving material.

In some embodiments herein, for example when the weight measurement device is calibrated, this embodiment provides an improved measurement at the second site, i.e. a more accurate weight measurement which is advantageous in providing a more accurate digital confirmation receipt compared to if the digital confirmation receipt was only based on the estimated weight at the loading site and/or a non-calibrated weight measurement device at the second site. This is especially advantageous when analysing the efficiency of the material transport from the loading site.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
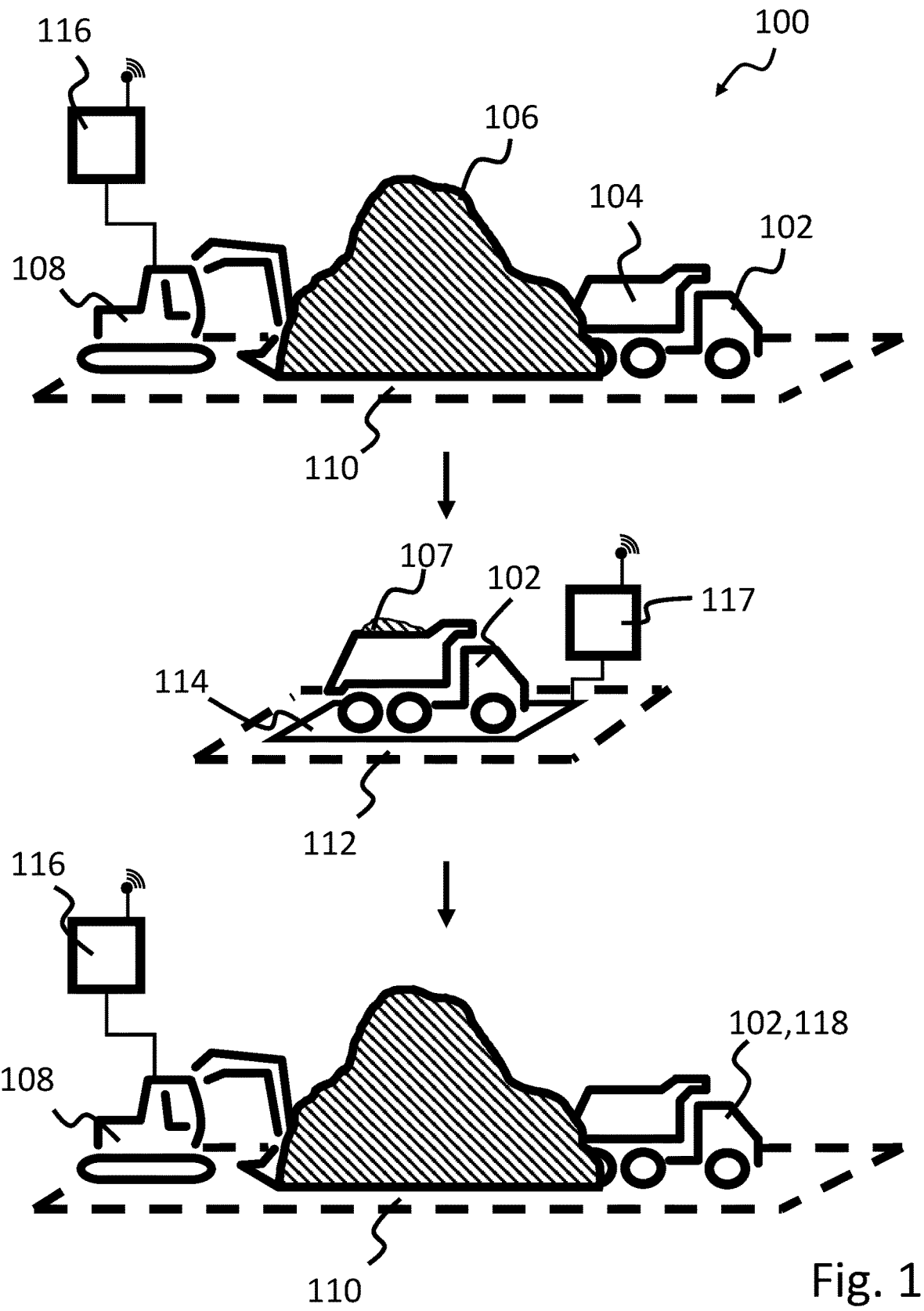
FIG. 1 is a schematic drawing illustrating a system.

With reference to FIG. 1 a system 100 for retrospectively weighing a transporting asset 102 will be discussed. The system 100 comprises a transporting asset 102 comprising a container 104 for receiving material 106. The system further comprises a loading asset 108 arranged at a loading site 110 and configured to load the container 104 of the transporting asset 102 with at least part of the material 106, such that the transporting asset 102 is provided with loaded material 107. The transporting asset 102 is configured to be transported to a second site 112 being remote from the loading site 108. The system 100 further comprising a weight measurement device 114 arranged at the second site 112. The weight measurement device 114 may be configured to measure the weight of the transporting asset 102 prior to the transporting asset 102 offloading the loaded material 107 of the transporting asset 102. In other words, the weight measurement device 114 may measure the weight of the transporting asset 102 including the loaded material 107. The weight measurement device 114 is configured to transmit weight data associated with the measured weight of the transporting asset 102. The system 100 further comprising a controller 116 configured to receive the weight data associated with the weight measured by the weight measurement device 114. Accordingly, the weight measurement device 114 may comprise, or be in signal connection with, a transmitter for transmitting the weight data. Optionally or alternatively, the weight measurement device 114 may be in signal connection to a second controller 117, wherein the second controller 117 is configured to transmit the weight data. The controller 116 is further configured to instruct the loading asset 108 to adapt its operation based on the weight data during a subsequent loading of a subsequent transporting asset. Accordingly, the controller 116 may be in signal connection with the loading asset 108. By one part being in signal connection with another part it is hereby meant that the parts have a wired or wireless connection such that signals may be transmitted between the two. For example, the controller 116 may be in wired or wireless connection with the weight measurement device 114. The controller 116 may also be in wired connection or wireless connection with the second controller 117. Further, the second controller 117 may be in wired connection or in wireless connection with the measurement device 114. It should further be understood that the controller 116 may form part of the loading asset 108. Accordingly, the loading asset 108 may comprise the controller 116. The subsequent transporting asset may be the transporting asset 102 and/or a second transporting asset 118. The controller 116 may be configured to instruct the loading asset in response to the controller receiving the weight data and/or in response to the loading asset subsequently loading a loading asset. It should be understood that the transporting asset 102 may return to the loading site 110 after the transporting asset 102 has off-loaded, i.e. dumped, the loaded material 107 preferably at a dump site. The second site 112 may be a site on a route between the loading site 110 and the dump site, alternatively the second site 112 may be the dump site. The system 100 may be configured to measure the weight of the subsequent transporting asset 102,118, wherein the loading asset 108 takes the weight of the loaded material 107 to one transporting asset (e.g. a first transporting asset) into account when loading at least one subsequent transporting asset (e.g. the first transporting asset 102 or the second transporting asset 118). The system may iteratively get feedback from, i.e. be instructed by, the weight measurement device at the second site for each transporting asset being loaded such that the loading asset 108 may continuously be instructed to adapt its operation during each subsequent loading. Accordingly, the loading asset 108 may, when being instructed, adapt its operation during each subsequent loading.

By retrospectively weighing a transporting asset is should be understood that the weight measurement is performed after the transporting asset have been loaded and not during loading of the transporting asset by the loader.

At least one of the weight measurement device 114 and the controller 116 may be configured to determine the weight of the material 106 loaded to the transporting asset based on a known weight of the transporting asset when the transporting asset is not loaded with material. Accordingly, the weight of the material 106 loaded to the transporting asset may be determined based on at least one of vehicle data associated with the transporting asset and a weight measurement of the transporting asset without the material being loaded. Vehicle data may provide a predetermined tare weight of the transporting asset, i.e. no material has been loaded to the container 104 of the transporting asset 102. The vehicle data may further provide the fuel weight based on a known amount, typically volume, of fuel in the transporting asset in order to determine the weight of the transporting asset when the transporting asset is unloaded. The latter may for be advantageous for transporting assets powered by added fuel, such as diesel, petrol, ethanol and/or gas. Alternatively, the weight of the transporting asset may be determined by a weight measurement of the transporting asset without the material being loaded. The weight measurement may for example be performed subsequently to the transporting asset off-loading the material. Accordingly, the least one of the weight measurement device 114 and the controller 116 may be configured to determine the weight of the material 106 loaded to the transporting asset by subtracting the weight of the transporting asset from the measured weight of the transporting asset.

The system 100 may be configured to provide an estimated weight of the loaded material 107. The loading asset 108 and/or the transporting asset 102 may be configured to generate the estimated weight of the loaded material 107. This may be achieved by using built-in weight measurement devices in the loading asset 108 and/or the transporting asset. Additionally, or optionally, the weight of the transporting asset may be determined by the number of times a bucket of the loading asset 108 is used to load the transporting asset. The loading asset 108 may estimate the weight of each filled bucket and the sum of the number of buckets may provide an estimate of the weight of the material loaded onto the transporting asset, i.e. the loaded material 107. The weight of each bucket may either be estimated based on an estimated volume and density of the material and/or built-in weight measurement devices in the loading asset 108. Additionally, or optionally, the weight of the material loaded onto the transporting asset may be estimated by visual inspection of the material loaded onto the transporting asset. As an example, the driver of the loader may estimate the weight by visually determine the amount of material loaded onto the transporting asset. The driver may estimate the weight of the loaded material 107 based on the visual inspection and an assumed density of the material. In another example, the loader may be equipped with an inspection device, such as an electromagnetic radiation inspection device, preferably a camera, a lidar and/or a radar. The inspection device may be configured to provide a material contour. The inspection device and/or the control unit 116 may be configured to estimate a weight of the loaded material based on the material contour and an estimated density of the material.

The estimation of the material weight may generally provide an insufficient input for accurately determine the weight of the loaded material For example, the built-in measurement devices typically have a low precision and/or are not always present. When estimation is based on visual inspection and/or the number of loaded buckets there may be uncertainty due to several factors such as voids in the material, wrongly assumed density, difference in weight of the material each time the bucket is loaded with the material. In should further be understood that other ways of estimating the weight of the loaded material that is known in the art may be performed. When estimating the weight based on a weight measurement, such as the built-in weight measurement devices, this may be performed by un-calibrated measurement devices in order to reduce cost and complexity at the loading site.

The estimation of the weight of the material is preferably performed in relation to the loading asset loading the transporting asset with the material, such that the loader may load the transporting asset with the estimated load providing an efficient loading procedure.

The transporting asset 102 may comprise a predetermined max payload. The predetermined max payload may be provided by for example vehicle data retrieved by the controller 116 and/or the loading asset 108 from the transporting asset 102. Additionally, or optionally, the vehicle data may be retrieved from a database (not shown). In that case the vehicle data is associated with a transporting asset identity and the vehicle data is matched with the identity of the transporting asset 102. The loading asset 108 may be configured to load the transporting asset 102 with at least part of the material based on the predetermined max payload and the estimated weight of the loaded material. In other words, the loading asset 108 may be configured to load the transporting asset 102 taking into account the low precision of estimating the weight of the material loaded onto the transporting asset. The low precision when estimating the weight may typically be equal to or more than 3%, in some cases more than 5%. In other words, the estimated weight may deviate from the actual weight according to the above. Accordingly, loading asset typically loads the transporting asset such that the weight of the material loaded onto the transporting asset will be significantly lower than the maximum payload of the transporting asset in order to not risk overloading. Overloading is disadvantageous as overloading may risk damaging the transporting asset being overloaded and/or risk fines for overloading when driving the transporting asset with an overload.

The loading asset 108 may during subsequent loading of the transporting asset 102 or the second transporting asset 118 base the loading on the weight data associated with the measured weight of the transporting asset, the estimated weight of the transporting asset, the maximum payload of the second transporting asset and an estimated weight of the second transporting asset.

Accordingly, the loading asset 108 and/or the controller 116 may determine a loading indicator indicating the ratio of the measured weight of the transporting asset 102 and the estimated weight of the transporting asset 102 and/or the difference between the measured weight of the transporting asset 102 and the estimated weight of the transporting asset 102. The loading indicator may be used for increasing or decreasing the weight of the material loaded during the subsequent loading of the transporting asset 102 and/or the second transporting asset 118. The loading indicator may be recorded onto the digital confirmation receipt. For example, if the estimated weight of the material loaded during the subsequent loading is estimated to be within an acceptable difference from the maximum payload of the transporting asset being loaded and/or if the estimated weight of the material loaded during the subsequent loading is estimated to have an acceptable ratio, normally indicating that the material load is sufficient, the controller may instruct the loader to adapt its operation further by increasing or decreasing the weight of the load based on the loading indicator. The instructions may comprise indication to increase or decrease the material weight loaded to the transporting asset in comparison to the estimated weight of the transporting asset. Subsequently, the operator of the loading asset may act based on the indication, alternatively, the loading asset may autonomously adapt its operation based on the indication. In this way, an increased efficiency by a material weight loaded onto the transporting asset closer to the maximum payload of the transporting asset will be achieved. In cases when the loader 108 systematically underloads the transporting asset 102 due to overestimation of the weight of the material loaded and/or due to deliberate underloading to not risk overloading, the above system may provide an increased weight of the material loaded onto the transporting asset without reaching overload, and thereby providing an increased efficiency. Further, the risk of overloading will be mitigated during the subsequent loading in cases when the loader 108 systematically overloads the transporting asset 102 due to underestimation of the weight of the material loaded.

The system may be configured to provide a digital confirmation receipt for the transporting asset in response to the transporting asset being loaded such that the digital confirmation receipt is associated with the estimated weight of the material loaded to the transporting asset. The digital confirmation receipt may be used to track and follow up the efficiency of the procedure of removing material from the loading site. The system may further be configured to update the digital confirmation receipt in response to the weight measurement device measuring the weight of the transporting asset such that the digital confirmation receipt is associated with the measured weight of the transporting asset. By updating the digital confirmation receipt, a more accurate digital confirmation receipt will be provided. It should be understood that the digital confirmation receipt may be updated by replacing the estimated weight with the measured weight or that the updated weight will be mean value based on both the measured weight and the estimated weight. This will in turn provide an improved accuracy when determining the efficiency of the procedure of removing the material from the loading site since the weight of the material may be based on both the estimation of material weight when loading and on the measured weight at the second site. Further, the weight measurement device at the second site may be calibrated. By calibrated it should be understood that the measurements device has been calibrated according to known standards in the art. This may also take into account time aspect, i.e. in order for the measurement device to be considered calibrated, the time between use and the time of calibration should be within what is stated in standards known in the art. Further discussions on standards will be omitted as the standards used for calibration is well known for the skilled person in the art.

The calibrated measurement device may further improve the accuracy when measuring the weight at of the transporting asset and thus the weight of the material loaded onto the transporting asset. Accordingly, when the digital confirmation receipt is updated based on the measurement at the second site, this will further improve the accuracy of the digital confirmation receipt. Typically, when the digital confirmation receipt is updated based on the measured weight by the measurement device and the measurement device is calibrated, the digital confirmation receipt is provided with the measured weight, i.e. the estimated weight is replaced by the measured weight.

In some embodiments, the weight measurement device may be configured to determine a measured total weight of the transporting asset that has a deviation from the actual total weight of the transporting asset being less than 100 kg, preferably less than 60 kg, more preferably less than 40 kg, most preferably less than 20 kg.

Typically, the weight measurement device may be configured to determine a measured total weight of the transporting asset that has a deviation from the actual total weight of the transporting asset being less than 2%, preferably less than 1%, more preferably less than 0.5%.

The weight measurement device may be a stationary weight measurements device located at the second site or a mobile weight measurements device that may be transported to the second site and moved according to demands.

Figure 2:
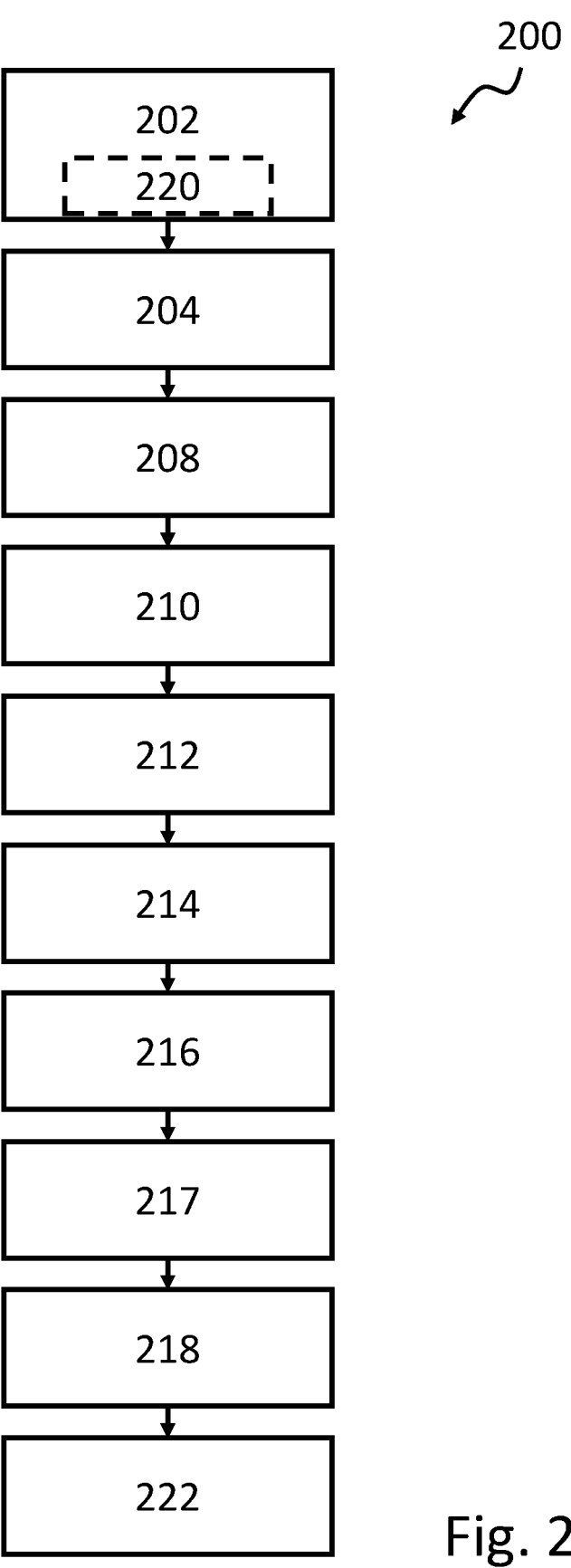
FIG. 2 is a schematic drawing illustrating a method.

With reference to FIG. 1 and FIG. 2, a computer implemented method 200 for retrospectively a transporting asset will be discussed.

The method comprises loading 202, by a loading asset 108, material 106 to a container 104 of a transporting asset 102 when the transporting asset 102 is arranged at a loading site 110.

The method further comprises transporting 204 the transporting asset 102 from the loading site 110 to a second site 112 and measuring 206 the weight of the transporting asset 102, by a weight measurement device 114 at the second site 112, prior to the transporting asset offloading the material.

Further, the method comprises transmitting 208, by the weight measurement device 114, weight data associated with the measured weight of the transporting asset 102 and receiving 210, by a controller 116, the weight data. The method 200 may further comprise instructing 212, by the controller 116, the loading asset 108 to adapt its operation based on the weight data during subsequent loading of the transporting asset 102 and/or a second transporting asset 118.

The method may further comprise determining 214 the weight of the material loaded 107 to the transporting asset based on at least one of vehicle data associated with the transporting asset and a weight measurement of the transporting asset without the material being loaded.

The method may further comprise providing 216 an estimated weight of the material loaded (i.e. the loaded material 107) to the transporting asset. The provision of the estimated weight may be done continuously during loading of the transporting asset.

The step of loading 202, by a loading asset 108, material to a container 104 of the transporting asset 102 may take into account a predetermined max payload of the transporting asset 102 and the estimated weight of the material loaded to the transporting asset 102.

The method further comprises loading 218 a second transporting asset based on the weight data associated with the measured weight of the transporting asset, the estimated weight of the transporting asset, an estimated weight of the second transporting asset and the maximum payload of the second transporting asset.

The step of loading 202 the transporting asset may comprise providing 220 a digital confirmation receipt for the transporting asset such that the digital confirmation receipt is associated with the estimated weight of the material loaded to the transporting asset. The method 200 may further comprise updating 222 the digital confirmation receipt in response to measuring the weight of the transporting asset such that the digital confirmation receipt is associated with the measured weight of the transporting asset.

Figure 3:
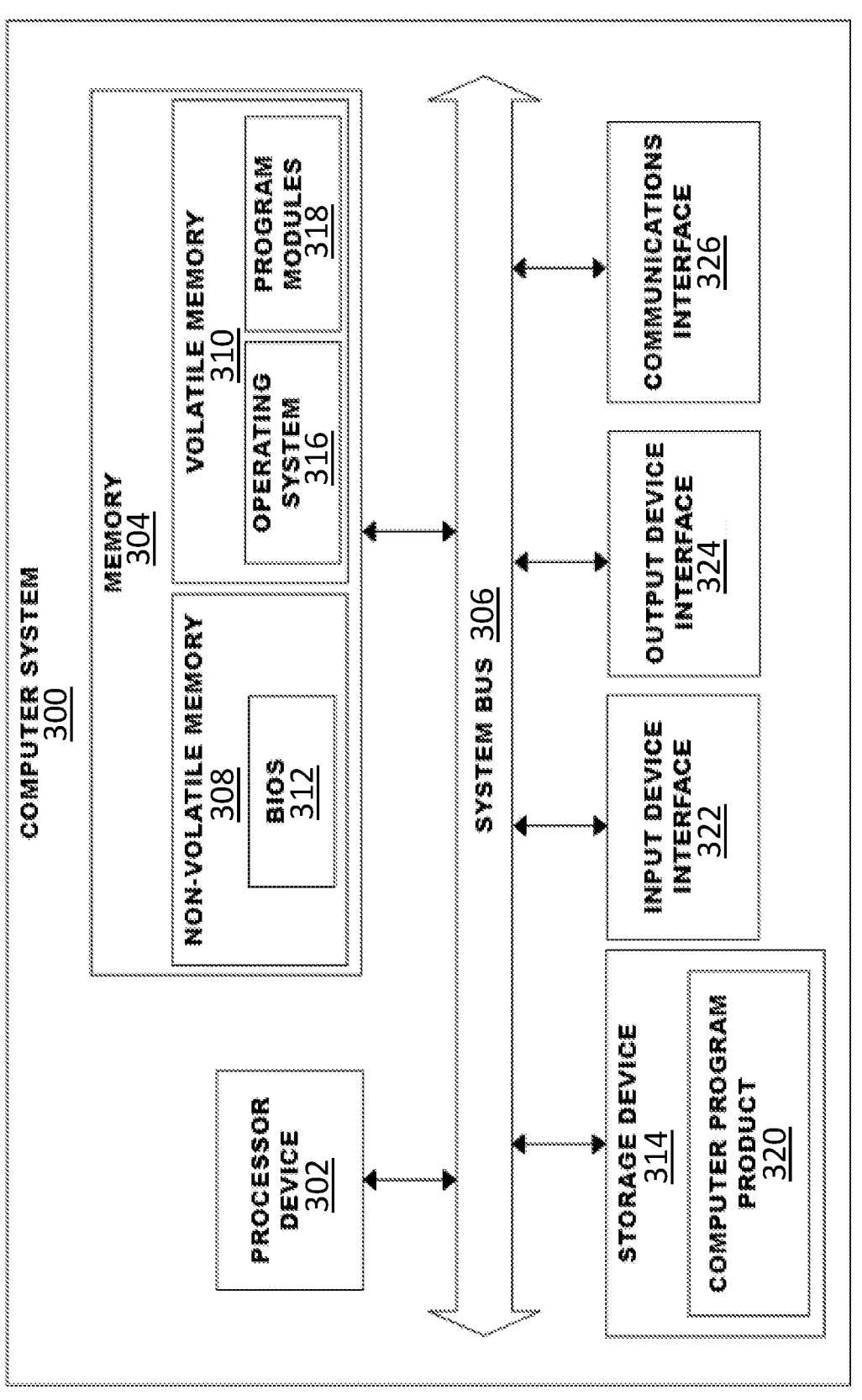

A controller 116,117 according to the discussions above may be realised by a computer system 300 as schematically illustrated in FIG. 3. The computer system 300 may be used for implementing examples disclosed herein. The computer system 300 is adapted to execute instructions from a computer-readable medium to perform these and/or any of the functions or processing described herein. The computer system 300 may be connected (e.g., networked) to other machines in a LAN, an intranet, an extranet, or the Internet. While only a single device is illustrated, the computer system 300 may include any collection of devices that individually or jointly execute a set (or multiple sets) of instructions to perform any one or more of the methodologies discussed herein.

The computer system 300 may comprise any computing or electronic device capable of including firmware, hardware, and/or executing software instructions to implement the functionality described herein. The computer system 300 includes a processor device 302 (may also be referred to as a control unit), a memory 304, and a system bus 306. The system bus 306 provides an interface for system components including, but not limited to, the memory 304 and the processor device 302. The processor device 302 may include any number of hardware components for conducting data or signal processing or for executing computer code stored in memory 304. The processor device 302 (i.e., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 306 may be any of several types of bus structures that may further interconnect to a memory bus (with or without a memory controller), a peripheral bus, and/or a local bus using any of a variety of bus architectures. The memory 304 may be one or more devices for storing data and/or computer code for completing or facilitating methods described herein. The memory 304 may include database components, object code components, script components, or other types of information structure for supporting the various activities herein. Any distributed or local memory device may be utilized with the systems and methods of this description. The memory 304 may be communicably connected to the processor device 302 (e.g., via a circuit or any other wired, wireless, or network connection) and may include computer code for executing one or more processes described herein. The memory 304 may include non-volatile memory 308 (e.g., read-only memory (ROM), erasable programmable read-only memory (EPROM), electrically erasable programmable read-only memory (EEPROM), etc.), and volatile memory 310 (e.g., random-access memory (RAM)), or any other medium which can be used to carry or store desired program code in the form of machine-executable instructions or data structures and which can be accessed by a computer or other machine with a processor device 302. A basic input/output system (BIOS) 312 may be stored in the non-volatile memory 308 and can include the basic routines that help to transfer information between elements within the computing device 300.

The computing device 300 may further include or be coupled to a non-transitory computer-readable storage medium such as the storage device 314, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 314 and other drives associated with computer-readable media and computer-usable media may provide non-volatile storage of data, data structures, computer-executable instructions, and the like.

A number of modules can be stored in the storage device 314 and in the volatile memory 310, including an operating system 316 and one or more program modules 318, which may implement the functionality described herein in whole or in part. All or a portion of the examples disclosed herein may be implemented as a computer program product 320 stored on a transitory or non-transitory computer-usable or computer-readable storage medium (i.e., single medium or multiple media), such as the storage device 314, which includes complex programming instructions, such as complex computer-readable program code, to cause the processor device 302 to carry out the steps described herein. Thus, the computer-readable program code can comprise software instructions for implementing the functionality of the examples described herein when executed by the processor device 302. The processor device 302 may serve as a controller, or control system, for the computing device 300 that is to implement the functionality described herein.

The computer system 300 also may include an input device interface 322 (e.g., input device interface and/or output device interface). The input device interface 322 may be configured to receive input and selections to be communicated to the computer system 300 when executing instructions, such as from a keyboard, mouse, touch-sensitive surface, etc. Such input devices may be connected to the processor device 302 through the input device interface 322 coupled to the system bus 306 but can be connected through other interfaces such as a parallel port, an Institute of Electrical and Electronic Engineers (IEEE) 1394 serial port, a Universal Serial Bus (USB) port, an IR interface, and the like. The computer system 300 may include an output device interface 324 configured to forward output, such as to a display, a video display unit (e.g., a liquid crystal display (LCD) or a cathode ray tube (CRT)). The computing device 300 may also include a communications interface 326 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

It is to be understood that the present invention is not limited to the embodiments described above and illustrated in the drawings; rather, the skilled person will recognize that many changes and modifications may be made within the scope of the appended claims.

The invention claimed is:

1. A system for retrospectively weighing a transporting asset, wherein the system comprises:
   a transporting asset comprising a container for receiving material;
   a loading asset arranged at a loading site and configured to load the container of the transporting asset with at least part of the material such that the transporting asset is provided with loaded material;
   wherein the transporting asset is configured to be transported to a second site being remote from the loading site, the system further comprising:
   a weight measurement device arranged at the second site, the weight measurement device is configured to measure the weight of the transporting asset prior to the transporting asset offloading the loaded material, the weight measurement device is configured to transmit weight data associated with the measured weight of the transporting asset;
   a controller configured to receive the weight data and instruct the loading asset to adapt its operation based on the weight data during a subsequent loading;
   wherein the system is configured to:
   provide an estimated weight of the loaded material in relation to the loading asset loads the transporting asset with at least part of the material;
   to provide a digital confirmation receipt for the transporting asset in response to the transporting asset being loaded such that the digital confirmation receipt is associated with the estimated weight of the material loaded to the transporting asset; and
   to update the digital confirmation receipt in response to the weight measurement device measuring the weight of the transporting asset such that the digital confirmation receipt is associated with the measured weight of the transporting asset.

2. The system according to claim 1, wherein at least one of the weight measurement device and the controller is configured to determine the weight of the loaded material based on at least one of vehicle data associated with the transporting asset and a weight measurement of the transporting asset without the material being loaded.

3. The system according to claim 1, wherein the transporting asset comprises a predetermined max payload and wherein the loading asset loads the transporting asset with the material based on the predetermined max payload and the estimated weight of the loaded material.

4. The system according to claim 1, wherein the loading asset, during subsequent loading of the transporting asset and/or the second transporting asset, is configured to load the transporting asset and/or the second transporting asset based on the weight data associated with the measured weight of the transporting asset, the estimated weight of the transporting asset, the maximum payload of a subsequent transporting asset and an estimated weight of the subsequent transporting asset.

5. The system according to claim 1, wherein the weight measurement device is a calibrated weight measurement device.

6. The system according to claim 1, wherein the weight measurement device is configured to determine a measured weight of the truck that has a deviation from the actual weight of the truck being less than 100 kg.

7. The system according to claim 1, wherein the weight measurement device is a stationary weight measurements device or a mobile weight measurements device.

8. A computer implemented method for retrospectively a transporting asset, the method comprises
   loading, by a loading asset, material to a container of a transporting asset when the transporting asset is arranged at a loading site;
   transporting the transporting asset from the loading site to a second site;
   measuring the weight of the transporting asset, by a weight measurement device at the second site, prior to the transporting asset offloading the material;
   transmitting, by the weight measurement device, weight data associated with the measured weight of the transporting asset;
   receiving, by a controller, the weight data, and;
   instructing, by the controller, the loading asset to adapt its operation during subsequent loading based on the weight data.

9. The computer implemented method according to claim 8, wherein the method comprises
   determining the weight of the material loaded to the transporting asset based on at least one of vehicle data associated with the transporting asset and a weight measurement of the transporting asset without the material being loaded.

10. The computer implemented method according to claim 8, wherein the method comprises
    providing an estimated weight of the material loaded to the transporting asset.

11. The computer implemented method according to claim 10, wherein the step of loading, by a loading asset, material to a container of the transporting asset takes into account a predetermined max payload of the transporting asset and the estimated weight of the material loaded to the transporting asset.

12. The computer implemented method according to claim 10 wherein the method further comprises determining a difference between the measured weight and the estimated weight of the transporting asset and wherein the step of instructing, by the controller, the loading asset to adapt its operation during subsequent loading of at least one transporting asset is based on the difference between the measured weight and the estimated weight of the transporting asset.

13. The computer implemented method according to claim 12, wherein the method comprises loading a subsequent transporting asset based on the difference between the measured weight and the estimated weight of the transporting asset.

14. The computer implemented method according to claim 10, wherein the step of loading the transporting asset comprises providing a digital confirmation receipt for the transporting asset such that the digital confirmation receipt is associated with the estimated weight of the material loaded to the transporting asset, and the method further comprises updating the digital confirmation receipt in response to measuring the weight of the transporting asset such that the digital confirmation receipt is associated with the measured weight of the transporting asset.

\*  \*  \*  \*  \*